United States Patent [19]
Fujino et al.

[11] 4,331,906
[45] May 25, 1982

[54] CATHODE RAY TUBE APPARATUS

[75] Inventors: Junichi Fujino; Hideto Miyazaki; Shigeki Ikehata, all of Amagasaki, Japan

[73] Assignee: Mitsubishi Denki Kabushiki Kaisha, Tokyo, Japan

[21] Appl. No.: 199,785

[22] PCT Filed: Jan. 11, 1979

[86] PCT No.: PCT/JP79/00006
§ 371 Date: Aug. 24, 1979
§ 102(e) Date: Aug. 24, 1979

[87] PCT Pub. No.: WO80/00518
PCT Pub. Date: Mar. 20, 1980

[30] Foreign Application Priority Data
Aug. 31, 1978 [JP] Japan .................. 53-107119

[51] Int. Cl.³ .................. H01J 29/70; H01J 29/76
[52] U.S. Cl. .................. 315/368; 315/13 C
[58] Field of Search .................. 315/368, 13 C

[56] References Cited
U.S. PATENT DOCUMENTS
3,735,191 5/1973 Peter .................. 315/13 C
3,891,889 6/1975 Fazio .................. 315/368
3,942,067 3/1976 Cawood .................. 315/368

FOREIGN PATENT DOCUMENTS
2012252 9/1971 Fed. Rep. of Germany.

Primary Examiner—Theodore M. Blum
Attorney, Agent, or Firm—Wenderoth, Lind & Ponack

[57] ABSTRACT

It is demanded to make the convergence correction of color cathode ray tubes a high accuracy. The problems of the color mis-register on color cathode ray tubes cause a bottleneck in this demand.

Instead of conventional convergence circuits based on passive elements (L, C, R etc.), the present invention realizes a high accuracy convergence circuit having active elements (transistors and the like) introduced thereinto. Namely, it is characterized in that, by comparing square signal voltages produced from an X and a Y deflecting signal voltage with some reference voltages, a picture surface of a cathode ray tube is partitioned into a central portion and a peripheral portion (the upper/lower and left/right ends,) and the individual portions can be separately adjusted.

3 Claims, 9 Drawing Figures

CATHODE RAY TUBE APPARATUS

TECHNICAL FIELD

This invention relates to a shadow-mask color cathode ray tube apparatus (which is called hereinafter a CRT apparatus), and more specifically to a color character display in which good convergence correction is provided following up deflections of electron beams.

BACKGROUND ART

The convergence correction in conventional cathode ray tube (which is called hereinafter a CRT) apparatus have obtained the desired convergence correcting magnetic field by flowing respectively the horizontal or vertical convergence coil with a current proportional to a parabolic waveform obtained by integrating the horizontal deflecting current or the vertical deflecting current with respect to time respectively. In such apparatus uniform convergence correction is only effected over the entire picture surface, and there have been the disadvantages that it is very difficult to effect the correction with a high accuracy over the entire picture surface and so on.

DISCLOSURE OF THE INVENTION

The present invention has been made in order to eliminate the prior art disadvantages as described above and is arranged to generate signal voltages substantially equal to $ae_X^2$ and $be_Y^2$ (where a and b are variable constants or constants individually variable in accordance with the polarity of $e_X$ and $e_Y$) from an X deflecting signal $e_X$ and a Y deflecting signal $e_Y$, compare these signal voltages with a reference voltage $e_{CX}$ or $e_{CY}$ separately generated thereby to partition a picture surface of a CRT into a central portion and a peripheral portion (a left/right and an upper/lower end), generate different adjustable correction signal voltages for the central and peripheral portions thus partitioned and pass convergence currents corresponding to those correction signal voltages through the convergence coil respectively. The picture surface of the CRT is partitioned into the central portion where the convergence is easily effected and the peripheral portion where the convergence is bad and further the partitioned central or peripheral portion is divided into the upper/lower part and the left/right part thereby to make it possible to adjust separately the convergence. Since the temporal characteristics of the deflection is not pertinent, it is possible to be applied to the display of color images resulting from not only the raster scanning but also random scannings and its effect is great.

BEST MODE FOR CARRYING OUT THE INVENTION

In order to facilitate an understanding, an outline of the present invention is described. The present invention is to generate a signal that is $ae_X^2 + be_Y^2$ from an X and a Y deflecting signal $e_X$ and $e_Y$ supplied to a CRT apparatus and flow a convergence coil with a current proportional to the signal voltage while partitioning a picture surface of a CRT into a central portion and a peripheral portion at a position of $ae_X^2 = e_{CX}$ in the direction of the X axis and at a position of $be_Y^2 = e_{CY}$ in the direction of the Y axis and making it possible to adjust the convergence separately on the partitioned central and peripheral portions. In more detail, said picture surface of the CRT is partitioned into the upper and lower sides and the left and right and the convergence on at least said peripheral portion is made possible to be adjusted separately on the upper on lower sides and the left and right.

Figure 1:
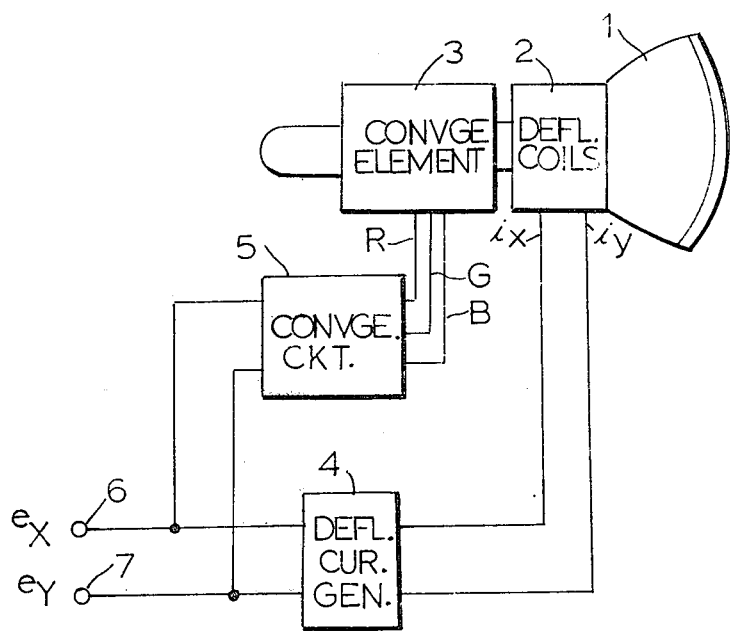
FIG. 1 is a block diagram illustrating a general construction of a cathode ray apparatus using a shadow-mask CRT.

The construction and operation of the present invention is hereinafter described in detail. FIG. 1 is a structural diagram of a general CRT apparatus. In the FIG. (1) is a CRT, (2) a deflecting coil, (3) a convergence correction element, (4) a circuit for generating deflecting current, and (5) is a convergence correction circuit. (6) and (7) are input terminal for an X and a Y deflecting signal respectively. Assuming that the X and Y deflecting signals are given by signal voltages which are $e_X$ and $e_Y$, the convergence correction circuit (5) in conventional apparatus generates convergence correction currents on the basis of signal waveforms (which are properly adjusted in accordance with a correction amount for each at R, G and B) proportional to respective time-integral values of the $e_X$ and $e_Y$. If, in this case, a scanning system of the CRT apparatus is the raster scanning with a constant period, each of the deflecting signal voltages $e_X$ and $e_Y$ becomes a saw-toothed wave having a constant time constant, and therefore the time-integral values of the $e_X$ and $e_Y$ form parabolic waveforms repeated with constant periods. As a result, there is generated a convergence correction current proportional to $e_X^2$ or $e_Y^2$. That is, the convergence correction is proportional to the square of a deflection distance and meets the requirements for effecting a first order approximation of the convergence correction. However it is apparent in conventional apparatus that the scanning system is limited to the raster scanning with a constant period and it is difficult to effect the convergence correction over the entire area of the picture surface of the CRT with a high accuracy.

Figure 2:
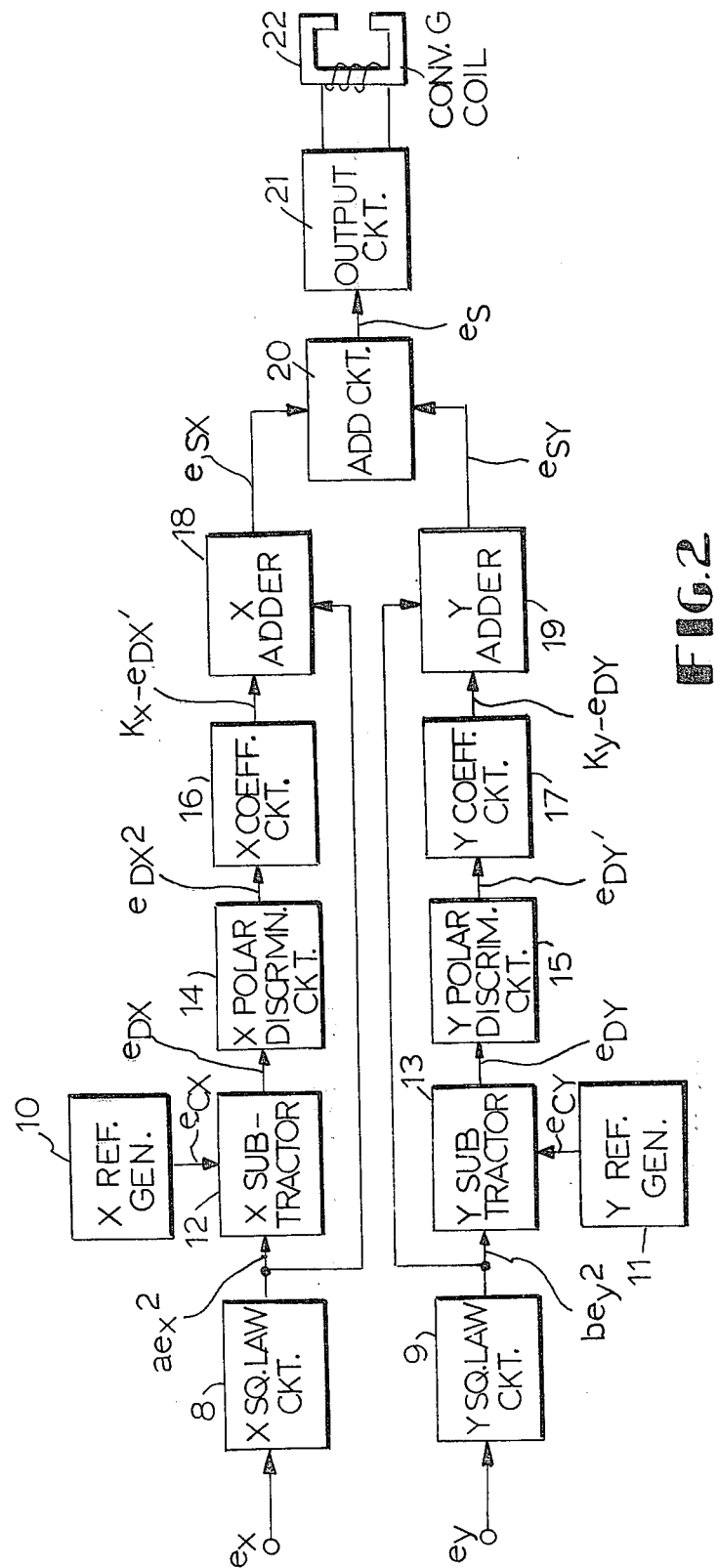
FIG. 2 is a block diagram illustrating one embodiment of a convergence correction circuit according to the present invention.

FIG. 2 is a block diagram illustrating one embodiment of a construction of the convergence correction circuit (5) according to the present invention. In the FIG. (8) shows a square law circuit making the deflecting signal voltage $e_X$ an input to provide an output voltage $ae_X^2$ substantially proportional to $e_X^2$, (9) a square law circuit making the deflecting signal voltage $e_Y$ an input to provide an output voltage $be_Y^2$ substantially proportional to $e_Y^2$, (10) a reference signal generation circuit for generating a reference voltage $e_{CX}$ for partitioning a central portion and a peripheral portion in the direction of the X axis, (11) a reference signal generation circuit for generating a reference voltage $e_{CY}$ for partitioning a central portion and a peripheral portion in the direction of the Y axis, (12) a subtraction circuit for providing a signal voltage that is $e_{DX}=ae_X^2-e_{CX}$ from the output $ae_X^2$ from said square law circuit (8) and the output $e_{CX}$ from said reference signal generation circuit (10), (13) a subtraction circuit for providing similarly a signal voltage that is $e_{DY}=be_Y^2-e_{CY}$ from the output $ae_Y^2$ from the square law circuit (9) and the output $e_{CY}$ from the reference signal generation circuit (11), (14) a polarity discrimination circuit for discriminating the polarity of the signal voltage $e_{DX}$ and delivering an output $e_{DX}'$ only when $e_{DX} \geq 0$, (15) a polarity discrimination circuit for discriminating the polarity of the signal voltage $e_{DY}$ and delivering an output $e_{DY}'$ only when $e_{DY} \geq 0$, (16) a coefficient circuit for providing a signal voltage $K_X \cdot e_{DX}'$ that is the signal voltage $e_{DX}'$ multiplied by a suitable coefficient $K_X$, (17) a coefficient circuit for providing a signal voltage $K_Y \cdot e_{CY}'$ that is the signal voltage $e_{DY}'$ multiplied by a suitable coefficient $K_Y$, (18) a addition circuit for providing a signal voltage that is $e_{SX}=a \cdot e_X^2 + K_X \cdot e_{DX}'$ from the output $K_X \cdot e_{DX}'$ from the coefficient circuit (16) and the output $ae_X^2$ from the square law circuit (8), (19) an addition circuit for providing a signal voltage that is $e_{SY}=b \cdot e_Y^2 + K_Y \cdot e_{DY}^2$ from the output $K_Y \cdot e_{DY}'$ from the coefficient circuit (17) and the output $b \cdot e_Y^2$ from the square law circuit (9), (20) an addition circuit for providing a signal voltage that is $e_S = e_{SX} + e_{SY}$ from the output $e_{SX}$ from the addition circuit (18) and the output $e_{SY}$ from the output $e_{SY}$ from the addition circuit, (21) an output circuit making the output $e_S$ an input to generate an electric source proportional to the $e_S$ and (22) shows a convergence correction coil forming a part of the convergence correction element (3).

Figure 3A:
FIGS. 3A–3C are explanatory diagrams for explaining the operation, thereof.
Figure 3B:
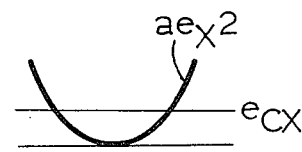
Figure 3C:
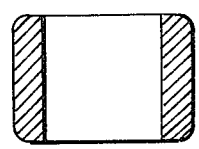

Now assuming that, when the deflecting signal voltages $e_X$ and $e_Y$ are inputted, the picture surface of the CRT is expressed by an X and a Y coordinate and an X and a Y deflected component of an electron beam are proportional to the $e_X$ and $e_Y$ respectively, the output $ae_X^2$ from the square law circuit (8) with respect to the deflecting signal voltage $e_X$ as shown in FIG. 3(a) is substantially as shown in (b), and by comparing this with the constant value $e_{CX}$ and separating it according to its magnitude, the central portion and the peripheral portion (the left/right end) in the direction of the X axis can be divided in the direction of the X axis on the picture surface of the CRT as shown in (C). Accordingly, a correction amount that is $e_{DX}'$ and acts only on the peripheral portion (the left/right end) can be obtained by discriminating the polarity of the output voltage $e_{DX}$:

$$e_{DX}=ae_X^2-e_{CX} \tag{1}$$

from the subtraction circuit (12) making the $ae_X^2$ and $e_{CX}$ the inputs and adding the $e_{DX}'$ to the convergence correction only when $e_{DX} \geq 0$. That is, if the polarity discrimination circuit 14 is operated to pass its intact input therethrough only when $e_{DX} \geq 0$ and to render the output null when $e_2 < 0$ then the output $e_{DX}'$ from that polarity discrimination circuit (14) becomes a signal acting only on the peripheral portion in said direction of the X axis. The coefficient circuit (16) is to multiply the output from the polarity discrimination circuit (14) by the suitable coefficient $K_X$. Since the $K_X \cdot e_{DX}'$ multiplied here by the coefficient $K_X$ is added to the output $ae_X^2$ from the square law circuit (8) in the next addition circuit (18), the output $e_{SX}$ from the addition circuit (18) is $$\text{(a) } e_{SX}=ae_X^2+K_X \cdot e_{DX}' \tag{2}$$

for $ae_X^2 \geq e_{CX}$ or $$\text{(b) } e_{SX}=ae_X^2 \tag{3}$$

for $ae_X^2 < e_{CX}$.

On the other hand, the similar operation is performed with a system making the deflecting signal voltage $e_Y$ an input. Namely, the output $be_Y^2$ from the squar law circuit (9) is compared with the output voltage $e_{CY}$ from the reference signation generation circuit 11 and a central portion and a peripheral portion (the upper/lower end) in the direction of the Y axis are divided according to its magnitude. The polarity descrimination circuit (15) discriminates polarity of the output voltage $e_{DY}$, $$e_{DY}=be_Y^2-e_{CY} \tag{4}$$

from the subtraction circuit (13) making the output $be_Y^2$ from the square law circuit and the output $e_{CY}$ from the reference signal generation circuit (13) the inputs, and passes it therethrough only when $e_{DY} \geq 0$, when $e_{DY} < 0$, the output is rendered null. The multiplication of the suitable coefficient $K_Y$ effected in the next coefficient circuit (17) results in the addition circuit (19) making this signal $K_Y \cdot e_{DY}'$ and the output $be_Y^2$ from the square law circuit (9) inputs to form its output $e_{SY}$, $$\text{(a) } e_{SY}=be_Y^2+K_Y \cdot e_{DY}' \tag{5}$$

for $be_Y^2 \geq e_{CY}$ or $$\text{(b) } e_{SY}=be_Y^2 \tag{6}$$

for $be_Y^2 < e_{CY}$.

The addition circuit 20 makes the output $e_{SX}$ from said addition circuit 18 and the output $e_{SY}$ from the addition circuit 19 inputs and its output $e_S$ is according to the relationships among the $ae_X^2$, $be_Y^2$, $e_{CX}$ and $e_{CY}$ as follows:

$$\begin{aligned} \text{(a) } e_S &= e_{SX} + e_{SY} \\ &= ae_X^2 + K_X \cdot e_{DX}' + be_Y^2 + K_Y \cdot e_{DY}' \\ &= ae_X^2 + be_Y^2 + K_X \cdot e_{DX}' + K_Y \cdot e_{DY}' \end{aligned} \tag{7}$$

for $ae_X^2 \geq e_{CX}$ and $be_Y^2 \geq e_{CY}'$, $$\begin{aligned} \text{(b) } e_S &= e_{SX} + e_{SY} \\ &= ae_X^2 + K_X \cdot e_{DX}' + be_Y^2 \\ &= ae_X^2 + be_Y^2 + K_X \cdot e_{DX}' \end{aligned} \tag{8}$$

for $ae_X^2 \geq e_{CX}$ and $be_Y^2 < e_{CY}'$, $$\begin{aligned} \text{(c) } e_S &= e_{SX} + e_{SY} \\ &= ae_X^2 + be_Y^2 + K_Y \cdot e_{DY}' \end{aligned} \tag{9}$$

for $ae_X^2 < e_{CX}$ and $be_Y^2 \geq e_{CY}$ and $$\text{(d) } e_S = e_{SX} + e_{SY} \tag{10}$$

$$= ae_X^2 + be_Y^2$$

for $ae_X^2 < e_{CX}$ and $be_Y^2 < e_{CY}$. If a current proportional to a voltage that is this $e_S$ passes through the convergence coil (22) through the output circuit (21) then a corrector of the convergence is obtained satisfying the expressions (7), (8) and (9) on the peripheral portion and a correction of the convergence is obtained satisfying the expression (10) on the central portion. Here if values of the $e_{CX}$ and $e_{CY}$ and the positive and negative and polarity of the coefficients $K_X$ and $K_Y$ are made variable then the picture surface of the CRT can be partitioned into a central and a peripheral portion as predetermined and only the peripheral portion can be independently adjust. Also as a correction amount at a boundary between the central and peripheral portions is determined by the $e_{CX}$ and $e_{CY}$, no difference in correction amount is caused at the boundary between the central and peripheral portions.

Figure 4:
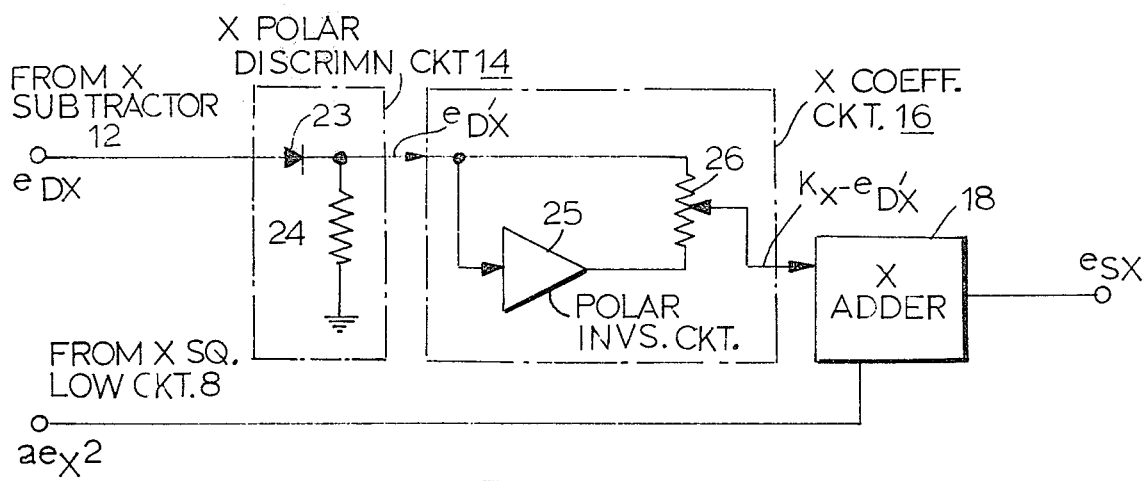
FIG. 4 is a diagram illustrating an example of a construction of the polarity discrimination circuit and coefficient circuit portions thereof.

FIG. 4 is a diagram illustrating a concrete embodiment of a circuit portion consisting of the polarity discrimination circuit (14) and the coefficient circuit (18) in said FIG. 2 wherein (23) is a diode; (24) a resistance, (25) a polarity inversion circuit and (26) is a potentiometer. In the Figure, the signal voltage $e_{DX}$ is half-wave rectified by the diode 23 and only a positive polarity portion $e_{DX}'$ thereof is inputted to the coefficient circuit (16). A signal voltage that is the $e_{DX}'$ is applied to one end of the potentiometer 26 while a signal voltage that is $-e_{DX}'$ is applied to the other end thereof by means of the polarity inversion circuit (25). Therefore an output voltage from the potentiometer 26 may take any value within a range of from the $e_{DX}'$ to $-e_{DX}'$. There is provided the effect equivalent to the value of the coefficient $K_X$ changing at will in a range of $-1 < K_X < 1$. Still more, a circuit portion consisting of the polarity discrimination circuit (15) and the coefficient circuit (17) is identical and may use this embodiment.

Figure 5:
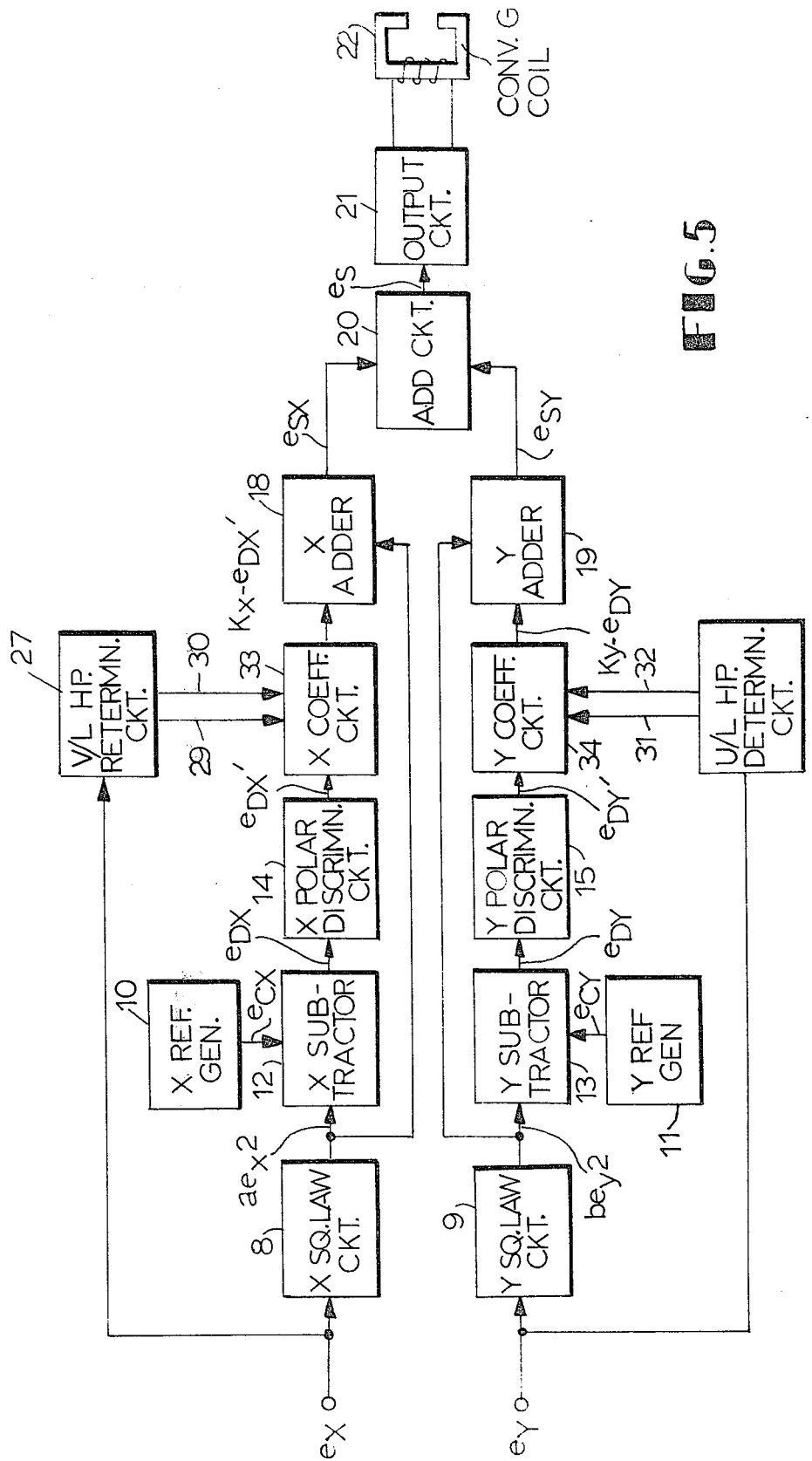
FIG. 5 is a block diagram illustrating another embodiment of the present invention.

FIG. 5 is a constructional diagram of another embodiment of the present invention by which the embodiment of FIG. 2 is developed to expand a degree of freedom of the convergence correction. In the FIG. (27) is a half plane discrimination circuit for discriminating the polarity of the deflecting signal voltage $e_X$ to discriminate which of left and right half planes in the direction of the X axis has electron beams lying therein, (28) a half plane discrimination circuit for discriminating the polarity of the deflecting signal voltage $e_Y$ to discriminate which of upper and lower half planes in the direction of the Y axis has the electron beams lying therein, (29) an output lead for delivering an output only when the deflecting signal voltage $e_X < 0$, that is to say, when the electron beams lie in the left half plane, (30) an output lead for delivering an output only when $e_X \geq 0$, that is, when the election beams lie in the right half plane, (31) an output lead for delivering an output only when the deflecting signal voltage $e_Y < 0$, that is to say, when the electron beams lie in the upper half plane, (32) an output lead for delivering an output only when $e_Y \geq 0$, that is, when the electron beams lie in the lower half plane, and (33) is a coefficient circuit for multiplying the signal $e_{DX}'$ obtained by the polarity discrimination circuit (14) and corresponding to the peripheral portion (the left and right ends) in the direction of the X axis by a coefficient $K_{X1}$ or a coefficient $X_{X2}$ when the output appears on the output lead (31) or the output lead (32) respectively in accordance with the status of the half plane discrimination circuit (28). (34) is a coefficient circuit for multiplying obtained by the polarity discrimination circuit (40) and corresponding to the peripheral portion (the upper/lower end) in the direction of the Y axis by a coefficient $K_{Y1}$ or a coefficient $K_{Y2}$ when the output appears on the output lead (31) or the output lead (32) respectively in accordance with the status of the half plane discrimination circuit (28). In the embodiment of the convergence circuit according to the construction of FIG. 5 the adjustment on the peripheral portion in the embodiment of FIG. 2 is effected independently on the upper/lower side and the left/right. Namely according to the conditions $ae_X^2 \geq e_{CX}$ and $be_Y^2 \geq e_{CY}$ or to the polarity of the deflecting signal voltages $e_X$ and $e_Y$ when the electron beams lies on the peripheral portion the output $e_S$ from the addition circuit (20) becomes (a) $e_S = ae_X^2 + be_Y^2 + K_{X1} \cdot e_{DX}' + K_{Y1} \cdot e_{DY}'$    (11)

for $e_X < 0$ and $e_Y < 0$, (b) $e_S = ae_X^2 + be_Y^2 + K_{X1} \cdot e_{DX}' + K_{Y2} \cdot e_{DY}'$    (12)

for $e_X < 0$ and $e_Y \geq 0$, (c) $e_S = ae_X^2 + be_Y^2 + K_{X2} \cdot e_{DX}' + K_{Y1} \cdot e_{DY}'$    (13)

for $e_X \geq 0$ and $e_Y < 0$ or (d) $e_S = ae_X^2 + be_Y^2 + K_{X2} \cdot e_{DX}' + K_{Y2} \cdot e_{DY}'$    (14)

for $e_X \geq 0$ and $e_Y \geq 0$.

If a current proportional to this signal voltage $e_S$ flows through the convergence coil (22) through the output circuit coil (21) and if the positive and negative and magnitude of the coefficients $K_{X1}$, $K_{X2}$, $K_{Y1}$ and $K_{Y2}$ are made variable then the upper/lower and left/right convergence adjustments can be independently effected on the peripheral portion of the CRT picture surface.

For the same reasons as described above no difference is caused at the boundary between the central and peripheral portions.

Figure 6:
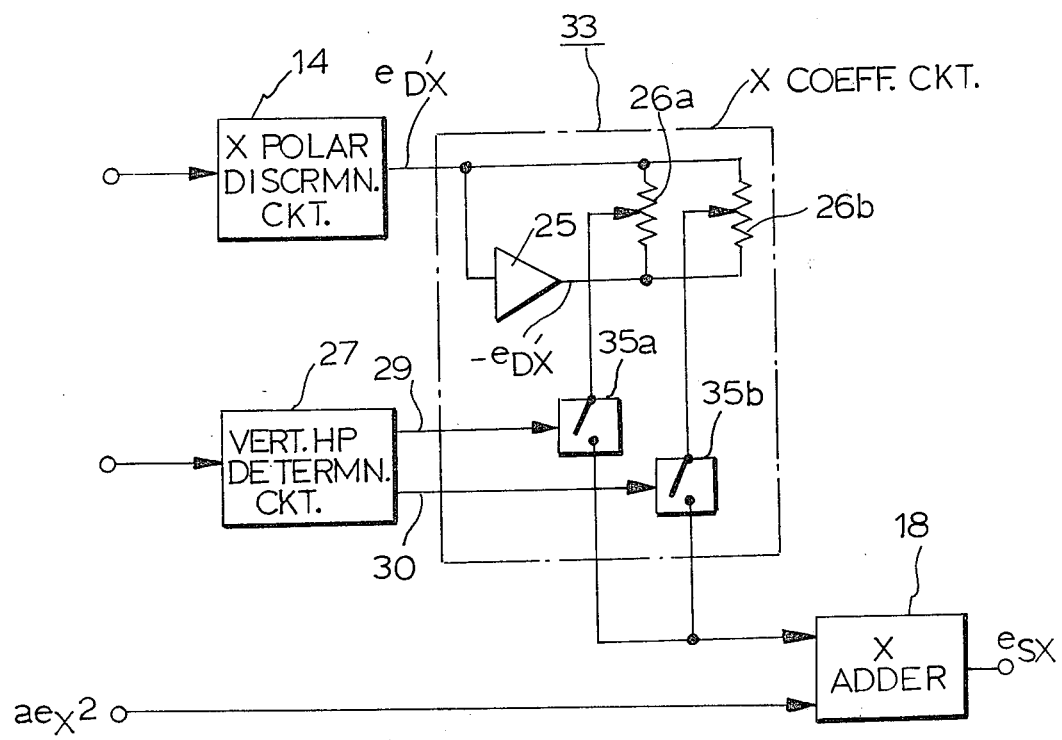
FIG. 6 is a diagram illustrating an example of a construction of the coefficient circuit portion thereof.

FIG. 6 shows an example of the concrete construction of the coefficient circuit (33) in this case.

In the FIG. (26a) and (26b) show potentiometers and (35a) and (35b) show analog gates. This circuit has different coefficients $K_{X1}$ and $K_{X2}$ set by the potentiometers (26a) and (26b), and either one of the analog gates (35a) and (35b) is selected to be enabled with the output from the half plane discrimination circuit (27) and inputted to the addition circuit (18). Still also the coefficient circuit (34) may use a circuit of that construction.

Figure 7:
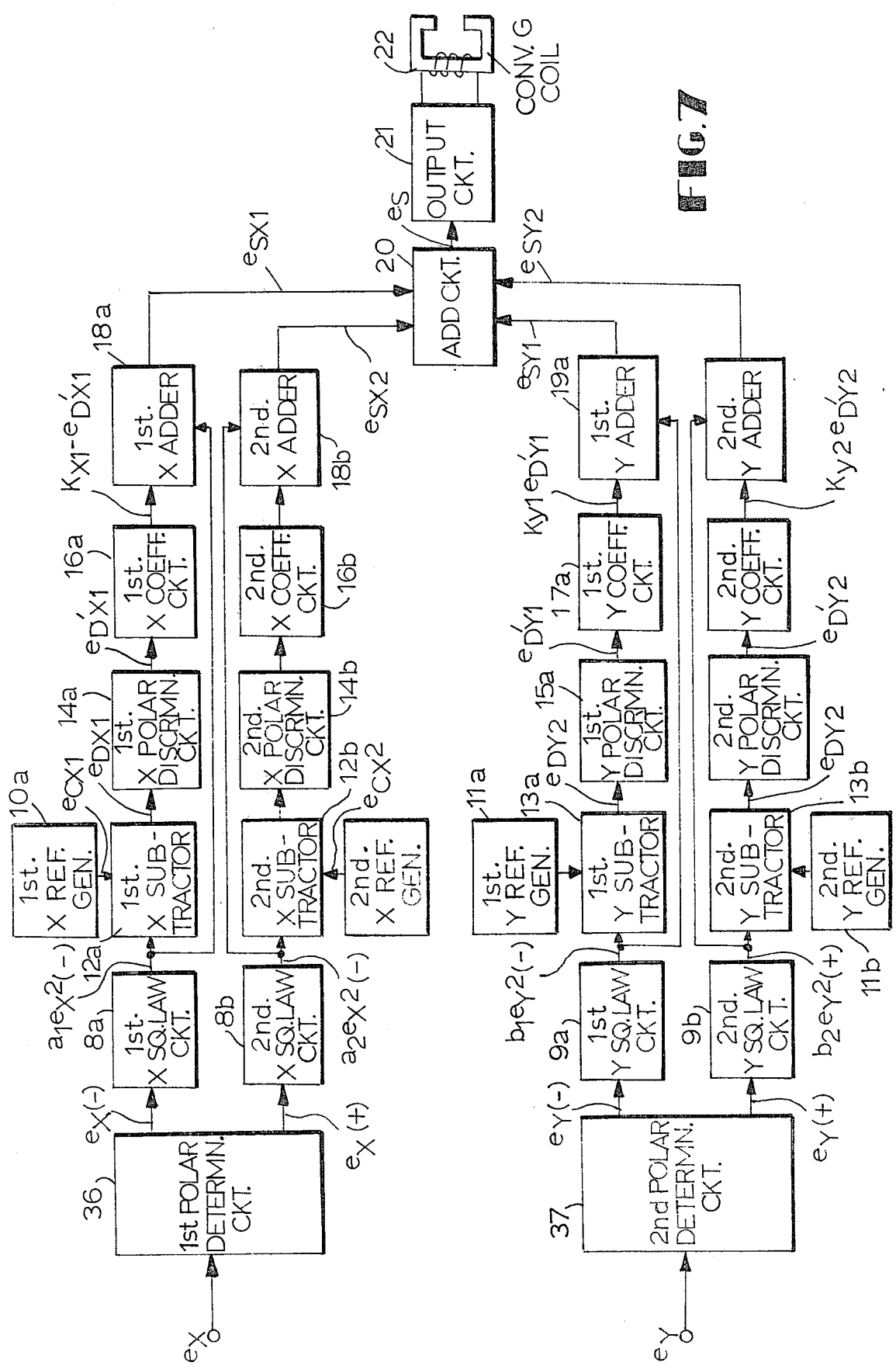
FIG. 7 is a block diagram illustrating still another embodiment of the present invention.

FIG. 7 is a diagram illustrating another further developed embodiment of the present invention which makes it possible to adjust the convergence adjustment independently on the upper/lower side and the left/right not only on the peripheral portion as in the embodiment of FIG. 5 but also on the central CRT portion. In FIG. (36) and (37) are polarity discriminating circuits and (8a), (8b) and (9a) and (9b) are square law circuits capable of adjusting the characteristics. The polarity of input signals $e_X$ and $e_Y$ are discriminated by the polarity discrimination circuits (36) and (37) and the input signals $e_x$ and $e_y$ when negative are inputted to the square law circuits (8a) and (9a) respectively while the input signals $e_X$ and $e_Y$ when positive are inputted to the square law circuits ($8b$) and ($9b$) respectively. Outputs from the square law circuits ($8a$), ($8b$), ($9a$) and ($9b$) are $a_1e_X^2(-)$, $a_2e_X^2(+)$, $b_1e_Y^2(-)$ and $b_2e_Y^2(+)$, respectively.

Here $a_1$, $a_2$, $b_1$ and $b_2$ indicate the characteristics of the square law circuits ($8a$), ($8b$), ($9a$) and ($9b$) respectively.

A system with the square law circuit ($8$), the reference signal generation circuit ($10$), the subtraction circuit ($12$), the polarity discrimination circuit ($14$), the coefficient circuit ($16$) and the addition circuit ($18$) performs the similar operation as in the embodiment of FIG. 2, and $e_{SX1}$ is outputted at the output of the addition circuit ($18a$) while $e_{SX2}$ is outputted at the output of the addition circuit ($18b$). A system with the square law circuit ($9$), the reference signal generation circuit ($11$), the subtraction circuit ($13$), the polarity discrimination circuit ($15$), the coefficient circuit ($17$) and the addition circuit ($19$) performs also the similar operation as in the embodiment of FIG. 2 and $e_{SY1}$ is outputted at the output of the addition circuit ($19a$) while $e_{SY2}$ is outputted at the output of the addition circuit ($19b$). Those outputs $e_{SX1}$, $e_{SX2}$, $e_{SY1}$ and $e_{SY2}$ become convergence correction signal voltages for the left/right and the upper/lower half planes of the CRT picture surface respectively. ($38$) is an addition circuit for adding those signal voltages. On the central portion of the CRT picture surface, or for $$a_1e_X^2 < e_{CX1} \text{ and } a_2e_X^2 < e_{CX2} \text{ and } b_1e_Y^2 < e_{CY1} \text{ and } b_2e_Y^2 < e_{CY2}. \quad (15)$$

An output $e_S$ from the addition circuit 38 is according to the polarity of the $e_X$ and $e_Y$ as follows:

(a) $e_S = e_{SX1} + e_{SY1} = a_1e_X^2 + b_1e_Y^2$ \quad (16)

for $e_X < 0$ and $e_Y < 0$, (b) $e_S = e_{SX1} + e_{SY2} = a_1e_X^2 + b_2e_Y^2$ \quad (17)

for $e_X < 0$ and $e_Y \geq 0$, (c) $e_S = e_{SX2} + e_{SY1} = a_2e_X^2 + b_1e_Y^2$ \quad (18)

for $e_X \geq 0$ and $e_Y < 0$, or (d) $e_S = e_{SX2} + e_{SY2} = a_2e_X^2 + b_2e_Y^2$ \quad (19)

for $e_X \geq 0$ and $e_Y \geq 0$. That is, even on the central portion of the CRT picture surface given by the expression (15) the left/right and upper/lower convergence corrections can be separately effected by changing the characteristics of the square law circuits ($8a$), ($8b$) and ($9a$), ($9b$). On the peripheral portion of the CRT picture surface or for $$a_1e_X^2 \geq e_{CX1} \text{ and } a_2e_X^2 \geq e_{CX2} \text{ and } b_1e_Y^2 \geq e_{CY1} \text{ and } b_2e_Y^2 \geq e_{CY2} \quad (20)$$

the convergence adjustment can be, of course, effected dependently on the left/right and upper/lower side by changing the positive and negative and magnitude of the coefficients $K_{X1}$, $K_{X2}$, $K_{Y1}$ and $K_{Y2}$ of the coefficient circuits ($16a$), ($16b$), ($17a$) and ($17b$) as in the embodiment of FIG. 5. Also the boundary between the central and peripheral portions does not cause a difference in amount of convergence correction for the same reason as described above. Further, by varying values of the output voltages $e_{CX1}$, $e_{CX2}$ and $e_{CY1}$, $e_{CY2}$ from the reference signal generation circuits ($10a$), ($10b$) and ($11a$), ($11b$), a position of the boundary between the central and peripheral portions may be also displaced freely.

The expression of the square law used in the embodiments as described above means what has the characteristic substantially approximating the square law but not the strict square law.

What is claimed is:

1. A cathode ray tube apparatus having a shadow-mask color cathode ray tube having a plurality of electron guns and means for deflecting electron beams in said cathode ray tube in a direction of an X axis and in a direction of a Y axis and constructed so that information is displayed in color on a display surface of said cathode ray tube characterized by a convergence correction circuit including a first and a second square law circuit making said X axis deflecting signal $e_X$ and a Y axis deflecting signal $e_Y$ square waveform signals $ae_X^2$ and $be_Y^2$ multiplied by predetermined coefficients a and b, respectively, reference signal generation circuits for generating reference signals $e_{CX}$ and $e_{CY}$, subtraction circuits for providing differences between said square waveform signal $ae_X^2$, $be_Y^2$ and said reference signals $e_{CS}$, $e_{CY}$, polarity discrimination circuits for discriminating the polarity of output signals $e_{DX}$ and $e_{DY}$ from said subtraction circuits and outputting signals which are $e_{DX} \geq 0$ and $e_{DY} \geq 0$, coefficient circuits for multiplying the output signals $e_{DX}'$ and $e_{DY}'$ from said polarity discrimination circuits by predetermined coefficients $K_X$ and $K_Y$, first addition circuits for adding output signals $K_X \cdot e_{DX}'$ and $K_Y \cdot e_{DY}'$ from said coefficient circuits to said square waveform signals $ae_X^2$ and $be_Y^2$, a second addition circuit for adding output signals $e_{SX}$ and $e_{SY}$ from said first addition circuits, and an output circuit driven with an output signal $e_S$ from said second addition circuit to pass a deflecting current corresponding to said signal $e_S$ through said deflecting means.

2. A cathode ray tube apparatus having a shadow-mask color cathode ray tube having a plurality of electron guns and deflecting means for deflecting electron beams in said cathode ray tube in a direction of an X axis and in a direction of a Y axis and constructed so that information is displayed in color on a display surface of said cathode ray tube, characterised by a convergence correction circuit including a first and a second square law circuit making an X axis deflecting signal $e_X$ and a Y axis deflecting signal $e_Y$ square waveform signals $ae_X^2$ and $be_Y^2$ multiplied by predetermined coefficients a and b respectively, reference signal generation circuits for generating reference signals $e_{CX}$ and $e_{CY}$, subtraction circuits for providing differences between said square waveform signals $ae_X^2$, $be_Y^2$ and said reference signals $e_{CX}$, $e_{CY}$, polarity discrimination circuits for discriminating the polarity of said deflecting signals $e_X$ and $e_Y$ and outputting signals which are $e_{DX} \geq 0$ and $e_{DY} \geq 0$, a half plane discrimination circuits for discriminating the polarity of said deflecting signals $e_X$ and $e_Y$ and delivering signals representing which of the upper and lower half planes on the display surface of said cathode ray tube and which of the left and right half planes on the display surface have electron beams which are scanning said display surface, belonging thereto, coefficient circuits for multiplying said signals $e_{DX}$, and $e_{DY}'$ by coefficients $K_{X1}$, $K_{X2}$ and $K_{Y1}$, $K_{Y2}$ predetermined for said individual half planes respectively first addition circuits for adding output signals $K_{X1} \cdot e_{DX}'$ or $K_{X2} \cdot e'_{DX}$ and $K_{Y1} \cdot e_{DY}'$ or $K_{Y2} \cdot e_{DY}'$ from said coefficient circuits to said square waveform signals $ae_X^2$ and $be_Y^2$, a second addition circuit for adding output signals $e_{SX}$ and $e_{SY}$ from said first addition circuits, and an output circuit driven with an output signal $e_S$ from said second addition circuit to pass a deflecting current corresponding to said signal $e_S$ through said deflecting means.

3. A cathode ray tube apparatus having a shadow-mask color cathode ray tube having a plurality of electron guns and deflecting means for deflecting electron beams in said cathode ray tube in a direction of an X axis and in a direction of a Y axis and constructed so that information is displayed in color on a display surface of said cathode ray tube, characterized by a convergence correction circuit including a first and a second polarity discrimination circuit for discriminating the polarity of an X axis deflecting signal $e_X$ and a Y axis deflecting signal $e_Y$ respectively and outputting signals which are $e_X(+), e_X(-), e_Y(+)$ and $e_Y(-)$, a first through a fourth square law circuit for outputting square waveform signals $a_1e_X^2(+), a_2e_X^2(-), b_1e_Y^2(+)$ and $b_2e_Y^2(-)$ multiplied by predetermined coefficients $a_1, a_2, b_1$ and $b_2$ respectively, a first through a fourth reference signal generation circuits for generating reference signals $e_{CX1}, e_{CX2}, e_{CY1}$ and $e_{CY2}$, subtraction circuits for providing differences between said square waveform signals $a_1e_X^2(+), a_2e_X^2(-), b_1e_Y^2(+), b_2e_Y^2(-)$ and said reference signals $e_{CX1}, e_{CX2}, e_{CY1}, e_{CY2}$, polarity discrimination circuits for discriminating the polarity of output signals $e_{DX1}, e_{DX2}, e_{DY1}$ and $e_{DY2}$ from those circuits and outputting signals $e_{DX1}', e_{DX2}', e_{DY1}'$ and $e_{DY2}'$ which are $e_{DX1} \geq 0, e_{DX2} \geq 0, e_{DY1} \geq 0$ and $e_{DY2} \geq 0$, coefficient circuits for multiplying the output signals $e_{DX1}', e_{DX2}', e_{DY1}'$ and $e_{DY2}'$ from said polarity discrimination circuits by predetermined coefficients $K_{X1}, K_{X2}, K_{Y1}$ and $K_{Y2}$ respectively, first addition circuits for adding output signals $K_{X1} \cdot e_{DX1}', K_{X2} \cdot e_{DX2}', K_{Y1} \cdot e_{DY1}'$ and $K_{Y2} \cdot e_{DY2}'$ from said coefficient circuits to said square waveform signals $a_1e_X^2(-), a_2e_X^2(+)$ and $b_1e_Y^2(-), b_2e_Y^2(+)$, a second addition circuit for adding output signals $e_{SX}$ and $e_{SY}$, and an output circuit driven with an output signal $e_S$ from said second addition circuit to pass a deflecting current proportional to said signal $e_S$ through said deflecting means.

* * * * *